(12) United States Patent
Ni et al.

(10) Patent No.: US 10,713,850 B2
(45) Date of Patent: Jul. 14, 2020

(54) SYSTEM FOR RECONSTRUCTING THREE-DIMENSIONAL (3D) HUMAN BODY MODEL USING DEPTH DATA FROM SINGLE VIEWPOINT

(71) Applicant: SONY CORPORATION, Tokyo (JP)

(72) Inventors: Jie Ni, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 16/139,845

(22) Filed: Sep. 24, 2018

(65) Prior Publication Data

US 2020/0098177 A1 Mar. 26, 2020

(51) Int. Cl.
*G06T 19/00* (2011.01)
*G06T 7/50* (2017.01)
*G06T 7/73* (2017.01)

(52) U.S. Cl.
CPC .............. *G06T 19/006* (2013.01); *G06T 7/50* (2017.01); *G06T 7/75* (2017.01); *G06T 2207/30196* (2013.01)

(58) Field of Classification Search
None
See application file for complete search history.

(56) References Cited

U.S. PATENT DOCUMENTS

| 8,139,067 | B2 | 3/2012 | Anguelov et al. | |
|---|---|---|---|---|
| 2014/0147014 | A1* | 5/2014 | Mallet | G06T 19/00 382/107 |
| 2018/0077400 | A1* | 3/2018 | Ayari | H04N 13/271 |
| 2018/0315230 | A1* | 11/2018 | Black | G06T 17/00 |

OTHER PUBLICATIONS

Guan, et al., "Estimating Human Shape and Pose from a Single Image", 08 pages.
Chen, et al., "Realtime Reconstruction of an Animating Human Body from a Single Depth Camera", IEEE Transactions on Visualization and Computer Graphics, vol. X, No. X, 2016, 14 pages.
Baak, et al., "A Data-Driven Approach for Real-Time Full Body Pose Reconstruction from a Depth Camera", 08 pages.
Wang, et al., "Im2Fit: Fast 3D Model Fitting and Anthropometrics using Single Consumer Depth Camera and Synthetic Data", 10 pages.

* cited by examiner

*Primary Examiner* — YuJang Tswei
(74) *Attorney, Agent, or Firm* — Chip Law Group

(57) ABSTRACT

Virtual reality-based apparatus that includes a memory device, a depth sensor and a modeling circuitry, captures a plurality of depth values of a first human subject from a single viewpoint using the depth sensor. The memory device stores a reference three dimensional (3D) human body model that comprises a mean body shape and a set of body shape variations. The modeling circuitry determines a first shape of the first human subject based on the plurality of depth values and generates a first deformed 3D human body model by deformation of the mean body shape. The modeling circuitry determines a first plurality of pose parameters for a first pose based on a plurality of rigid transformation matrices. The modeling circuitry generates a second deformed 3D human body model by deformation of a plurality of vertices and controls display of the second deformed 3D human body model as a reconstructed 3D model.

21 Claims, 6 Drawing Sheets

SYSTEM FOR RECONSTRUCTING THREE-DIMENSIONAL (3D) HUMAN BODY MODEL USING DEPTH DATA FROM SINGLE VIEWPOINT

CROSS-REFERENCE TO RELATED APPLICATIONS/INCORPORATION BY REFERENCE

None.

FIELD

Various embodiments of the disclosure relate to three-dimensional (3D) modeling technologies. More specifically, various embodiments of the disclosure relate to reconstruction of 3D human body model using depth data from single viewpoint.

BACKGROUND

Advancements in the field of three-dimensional (3D) computer graphics and 3D modeling, have provided the ability to create 3D models and visualize objects in a 3D computer graphics environment. Typically, a 3D stereo capture system may be utilized to generate a full 3D model of a human body. The 3D stereo capture system includes multiple stereo cameras that capture the human body from a plurality of viewpoints. However, such 3D stereo capture systems are expensive and may be undesirable for daily applications. Currently, certain attempts have been made to use depth data from a single viewpoint to prepare a full 3D model of the human body. However, in such cases, the computation cost of the full 3D model of the human body is high and the shape of the generated full 3D model of the human body may be inaccurate, which may be undesirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for reconstructing three-dimensional (3D) human body model using depth data from single viewpoint is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus for reconstructing three-dimensional (3D) human body model using depth data from a single viewpoint. Exemplary aspects of the disclosure provides a VR-based apparatus that includes a memory device configured to store a reference 3D human body model and structural information of a skeleton comprising a plurality of joints of a human body. The skeleton may be a digital rig. The stored reference 3D human body model may further comprise a mean body shape and a set of body shape variations that represent deviations from the mean body shape of the human body. The VR-based apparatus may be communicatively coupled to a sensing device that may include a depth sensor configured to capture a plurality of depth values of a human subject that is to be modeled from a single viewpoint. In contrast to the conventional systems, the disclosed VR-based apparatus deforms the stored reference 3D human body model based on the plurality of depth values captured from the single viewpoint to generate a reconstructed 3D model of a human subject. The disclosed VR-based apparatus determines optimal shape and optimal pose parameters for the deformation of the reference 3D human body model to generate the reconstructed 3D model of the human subject. As the plurality of depth values of the human subject are captured from a single viewpoint from a single depth sensor, the generation of the reconstructed 3D model of the human subject based on deformation of the stored reference 3D human body model reduces the computational cost for the generation of a full body 3D model of the human subject. Thus, the disclosed apparatus is cost-effective and capable of reconstructing a full 3D model of the human subject with accuracy using the deformed reference 3D human body model such that the distance between the deformed reference 3D human body model and the captured plurality of depth values is minimum.

Figure 1:
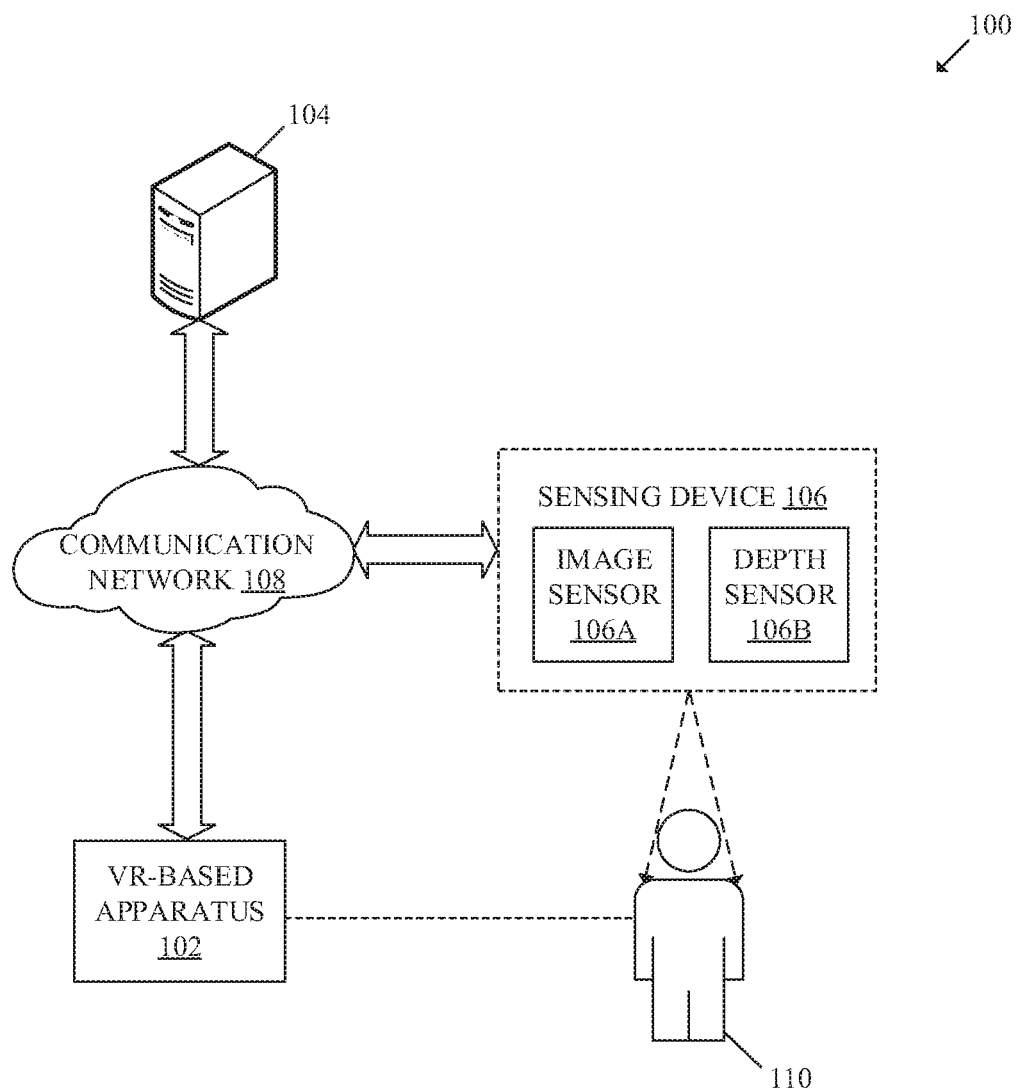
FIG. 1 is a block diagram that illustrates an exemplary network environment for reconstructing three-dimensional (3D) human body model using depth data from single viewpoint, in accordance with an embodiment of the disclosure.

FIG. 1 is a block diagram that illustrates an exemplary network environment for reconstructing 3D human body model using depth data from single viewpoint, in accordance with an embodiment of the disclosure. With reference to FIG. 1, there is shown a network environment 100. The network environment 100 may include a Virtual Reality (VR)-based apparatus 102, a server 104, a sensing device 106 and a communication network 108. The sensing device 106 may comprise an image sensor 106A and a depth sensor 106B. A first human subject 110, that is to be modeled, may be associated with the VR-based apparatus 102. The VR-based apparatus 102 may be communicatively coupled to the server 104 and the sensing device 106, via the communication network 108.

The VR-based apparatus 102 may comprise suitable logic, circuitry and interfaces that may be configured to generate a reconstructed 3D model of the first human subject 110. The VR-based apparatus 102 may be configured to generate the reconstructed 3D model of the first human subject 110 based on a plurality of depth values of the first human subject 110 captured by the depth sensor 106B from a single viewpoint. Examples of the VR-based apparatus 102 may include, but are not limited to, a computing device, a video-conferencing system, an augmented reality-based device, a gaming device, a mainframe machine, a server, a computer work-station, and/or a consumer electronic (CE) device.

The server 104 may comprise suitable logic, circuitry and interfaces that may be configured to store a reference 3D human body model and structural information of a skeleton (e.g., a rig) comprising a plurality of joints of a human body. The stored reference 3D human body model may further comprise a mean body shape and a set of body shape variations that represent deviations from the mean body shape of the human body. In some embodiments, the server 104 may be further configured to store the plurality of depth values of the first human subject 110 captured by the depth sensor 106B from the single viewpoint. In some embodiments, the server 104 may be implemented as a cloud server, which may be utilized to execute aforementioned operations of the server 104 through web applications, cloud applications, HTTP requests, repository operations, file transfer, gaming operations, and the like. Other examples of the server include, but are not limited to a database server, a file server, a web server, an application server, a mainframe server, or other types of server.

The sensing device 106 may comprise suitable logic, circuitry and interfaces that may be configured to capture the plurality of depth values of the first human subject 110 from the single viewpoint. The sensing device 106 may be further configured to capture a plurality of images of the first human subject 110 from the single viewpoint. The sensing device 106 may be configured to capture the plurality of depth values of the first human subject 110 from the single viewpoint in real time, near-real time, or a certain lag time. The sensing device 106 may be configured to transmit the captured plurality of depth values and the captured plurality of images of the first human subject 110 to the VR-based apparatus 102, via the communication network 108. The sensing device 106 may comprise a plurality of sensors, such as a combination of a depth sensor, a color sensor, (such as a red-green-blue (RGB) sensor), and/or an infrared (IR) sensor which may capture the first human subject 110 from the single viewpoint. Examples of the sensing device 106 may include, but are not limited to, the depth sensor, the RGB sensor, the IR sensor, a 3D-mesh structure generator used to move an object, an image sensor, or a motion-detector device.

The communication network 108 may include a communication medium through which the VR-based apparatus 102 may be communicatively coupled to the server 104 and the sensing device 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The first human subject 110 may refer to an object-of-interest whose reconstructed 3D model is to be generated. The first human subject 110 may be a human or a robot that may resemble a real human. The first human subject 110 may be associated with the sensing device 106 and VR-based apparatus 102.

In operation, sensing device 106 may comprise the image sensor 106A configured to capture a plurality of images of the first human subject 110 from a single viewpoint. In accordance with an embodiment, the captured plurality of images may be a plurality of color images of the first human subject 110. The sensing device 106 may further comprise the depth sensor 106B configured to capture a plurality of depth values of the first human subject 110 from the single viewpoint. The captured plurality of depth values may include values of "Z" coordinates of the first human subject 110 in a 3D coordinate system from the single viewpoint. The first human subject 110 may be at rest or in motion at an instance of capture of the plurality of images and the plurality of depth values. In accordance with an embodiment, the first human subject 110 may move (i.e., exhibit bending or other motion that deforms body) in a plurality of poses, such as a neutral standing pose, at the instance of capture of the plurality of images and the plurality of depth values.

In accordance with an embodiment, the VR-based apparatus 102 may be configured to learn a reference 3D human body model from a training dataset. The training dataset may be a 3D model dataset, for example the Caesar dataset or other representative human 3D computer graphics model dataset, that comprises a plurality of representative human body models of different shapes, for example, about 4000 representative human body models of different shapes in a neutral pose. The reference 3D human body model may include a mean body shape and a set of body shape variations. The mean body shape may be a neutral body shape of the reference 3D human body model. The reference 3D human body model may further include the set of body shape variations that comprises a plurality of human body models in different shapes, for example, a tall human body model, a short human body model, a thin human body model, a fat human body model and the like. The set of body shape variations may represent deviations from the mean body shape of the reference 3D human body model. The VR-based apparatus 102 may be configured to store the reference 3D human body model that includes the mean body shape and the set of body shape variations. The VR-based apparatus 102 may be further configured to store structural information of a skeleton (i.e., a rig) of a human body. The structural information of the skeleton of the human body may comprise structural information of a plurality of joints of the human body. The plurality of joints of the human body may comprise a root joint and a plurality of child joints of the human body connected to the root joint.

In accordance with an embodiment, the VR-based apparatus 102 may be configured to determine a first shape of the first human subject 110 based on the captured plurality of depth values of the first human subject 110 from the single viewpoint. The determined first shape of the first human subject 110 may be represented as a linear combination of the set of body shape variations. The VR-based apparatus 102 may be configured to determine a plurality of shape parameters to deform the mean body shape of the reference 3D human body model to the determined first shape of the first human subject 110. The VR-based apparatus 102 may be further configured to generate a first deformed 3D human body model based on deformation of the mean body shape of the reference 3D human body model to the determined first shape of the first human subject 110. The first deformed 3D human body model may resemble the first shape of the first human subject 110. The generation of the first deformed 3D human body model is described in details, for example, in FIG. 3A.

In accordance with an embodiment, the first deformed 3D human body model may be represented as the skeleton comprising the plurality of joints of the human body that may be stored in the VR-based apparatus 102. Each joint of the plurality of joints in the structural information of the skeleton of the human body may be associated with a rigid rotation based on a rotation angle and an axis of rotation of each joint of the plurality of joints. The VR-based apparatus 102 may be configured to compute a plurality of rigid transformation matrices for each joint of the plurality of joints. The plurality of rigid transformation matrices for each joint of the plurality of joints may be computed based on a rotation angle with respect to an axis of rotation of a joint of the plurality of joints and a location of the joint of the plurality of joints. The VR-based apparatus 102 may be configured to determine a first plurality of pose parameters for a first pose of the first human subject 110 based on the plurality of rigid transformation matrices and the captured plurality of depth values for the first pose of the first human subject 110. The computation of the plurality of rigid transformation matrices is described in details, for example, in FIG. 3B. Examples of the first pose or other poses may include, but are not limited to a bending pose, a jumping pose, a dancing pose, a change in movement of limbs, and the like.

In accordance with an embodiment, the VR-based apparatus 102 may be configured to determine a first plurality of blend weights for a plurality of vertices of the first deformed 3D human body model. Each blend weight of the first plurality of blend weights may indicate an extent of deformation that is to be exerted on each vertex of the plurality of vertices of the first deformed 3D human body model to represent the first pose of the first human subject 110. Alternatively stated, a blend weight of the first plurality of blend weights for a vertex may indicate an amount of deformation that may be required to be applied on the vertex as a result of one or more joints of the plurality of joints for representation of the first pose of the first human subject 110. The VR-based apparatus 102 may further control a deformation of the plurality of vertices of the first deformed 3D human body model based on the determined first plurality of blend weights for the plurality of vertices for the first pose of the first human subject 110.

In accordance with an embodiment, the VR-based apparatus 102 may be configured to generate a second deformed 3D human body model by deformation of the plurality of vertices of the first deformed 3D human body model. The deformation of the plurality of vertices of the first deformed 3D human body model may be based on a linear combination of the plurality of rigid transformation matrices of the plurality of joints and the determined first plurality of blend weights for the plurality of vertices for the first pose of the first human subject 110. The deformation of the plurality of vertices of the first deformed 3D human body model may be further based on the computed first plurality of pose parameters. Alternatively stated, the second deformed 3D human body model may resemble the first pose of the first human subject 110. In accordance with an embodiment, the VR-based apparatus 102 may be configured to control display of the generated second deformed 3D human body model as a reconstructed 3D model of the first human subject 110 on a display device. The reconstructed 3D model may exhibit minimum deviation from the determined first shape and the first pose of the first human subject 110.

In accordance with an embodiment, the VR-based apparatus 102 may be configured to estimate a change in configuration of each joint with respect to other joints of the plurality of joints in response to a change in pose of the first human subject 110. A pose of the first human subject 110 may change from the first pose to a second pose. The VR-based apparatus 102 may be configured to determine a second plurality of pose parameters for the second pose of the first human subject 110. The second plurality of pose parameters may be determined based on the plurality of rigid transformation matrices and the plurality of depth values captured from the single viewpoint for the second pose of the first human subject 110. The VR-based apparatus 102 may be configured to determine a second plurality of blend weights for a plurality of vertices of the second deformed 3D human body model for the second pose of the first human subject 110. Each blend weight of the second plurality of blend weights may indicate an extent of deformation that is to be exerted on each vertex of the plurality of vertices of the second deformed 3D human body model for the second pose of the first human subject 110. The VR-based apparatus 102 may be confi\gured to update the second deformed 3D human body model to a third deformed 3D human body model, based on deformation of the plurality of vertices of the second deformed 3D human body model. The plurality of vertices of the second deformed 3D human body model may be deformed based on the determined second plurality of blend weights and a second plurality of pose parameters for the second pose of the first human subject 110. Further, the VR-based apparatus 102 may be configured to update the display of the generated second deformed 3D human body model to the third deformed 3D human body model for the second pose on the display device (not shown in FIG. 1). The updated reconstructed 3D model may exhibit minimum deviation from the determined first shape and the second pose of the first human subject 110. The updated reconstructed 3D model may resemble the second pose of the first human subject 110.

In accordance with an embodiment, the reconstructed 3D model of the first human subject 110 for the first pose is an accurate reconstructed 3D model of the first human subject 110 as the reconstructed 3D model is generated based on deformation of the reference 3D human body model using optimal plurality of shape parameters and optimal plurality of pose parameters. Additionally, the reconstructed 3D model of the first human subject 110 may be generated at a low computational cost as a result of utilization of the plurality of depth values captured by the depth sensor 106B from a single viewpoint.

Figure 2:
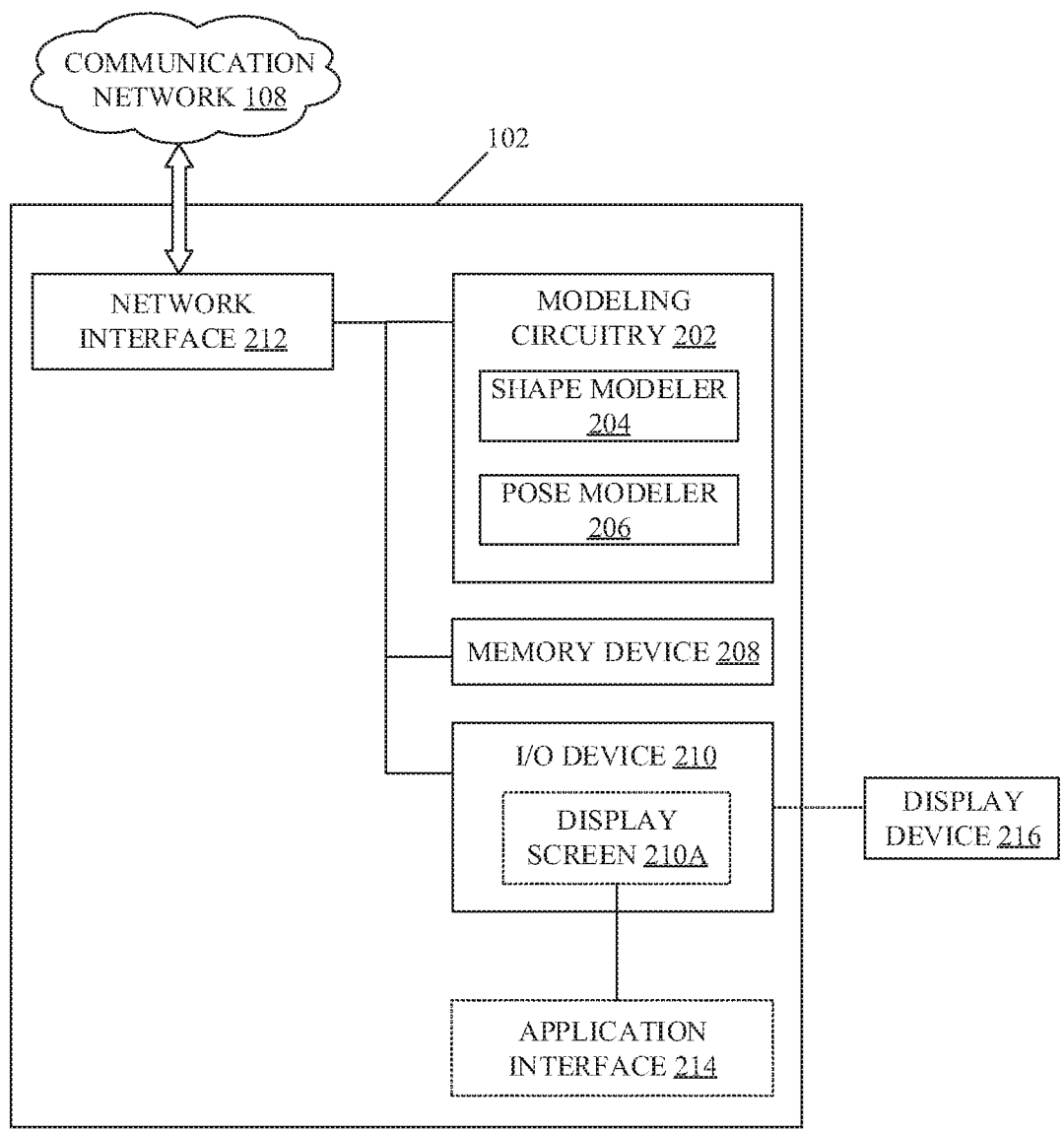
FIG. 2 is a block diagram that illustrates an exemplary apparatus for reconstructing three-dimensional (3D) human body model using depth data from single viewpoint, in accordance with an embodiment of the disclosure.

FIG. 2 is a block diagram that illustrates an exemplary VR-based apparatus, in accordance with an embodiment of the disclosure. FIG. 2 is explained in conjunction with elements from FIG. 1. With reference to FIG. 2, there is shown the VR-based apparatus 102. The VR-based apparatus 102 may include a modeling circuitry 202, a shape modeler 204, a pose modeler 206, a memory device 208, an input/output (I/O) device 210, and a network interface 212. The shape modeler 204 and the pose modeler 206 may be a part of the modeling circuitry 202. The I/O device 210 may include a display screen 210A, which may be utilized to render an application interface 214. The modeling circuitry 202 may be communicatively coupled to the memory device 208 and the I/O device 210. The modeling circuitry 202 may be configured to communicate with the server 104 and the sensing device 106, by use of the network interface 212.

The modeling circuitry 202 may comprise suitable logic, circuitry, and/or interfaces that may be configured to generate the reconstructed 3D model of the first human subject 110 based on the plurality of shape parameters and the plurality of pose parameters. The modeling circuitry 202 may be further configured to update the reconstructed 3D model of the first human subject 110 based on the change in pose of the first human subject 110 from the first pose to the second pose. The modeling circuitry 202 may comprise one or more specialized processing units, which may be implemented as a separate processor or circuitry in the VR-based apparatus 102. In an embodiment, the one or more specialized processing units and the modeling circuitry 202 may be implemented as an integrated processor or a cluster of processors that perform the functions of the one or more specialized processing units and the modeling circuitry 202, collectively. The modeling circuitry 202 may be implemented based on a number of processor technologies known in the art. Examples of implementations of the modeling circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The shape modeler 204 may comprise suitable logic, circuitry, and/or interfaces that may be configured to determine the plurality of shape parameters for the first pose of the first human subject 110. The shape modeler 204 may be configured to determine the first shape of the first human subject 110 based on the plurality of depth values of the first human subject 110 from the single viewpoint. The shape modeler 204 may be further configured to generate the first deformed 3D human body model based on deformation of the mean body shape of the reference 3D human body model to the determined first shape of the first human subject 110. Examples of implementations of the shape modeler 204 may be a specialized circuitry, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The pose modeler 206 may comprise suitable logic, circuitry, and/or interfaces that may be configured to determine the first plurality of pose parameters for the first pose of the first human subject 110. The pose modeler 206 may be further configured to determine the second plurality of pose parameters for the second pose of the first human subject 110. Additionally, the pose modeler 206 may be configured to compute the plurality of rigid transformation matrices for each joint of the plurality of joints of the stored structural information of the skeleton of the human body. The pose modeler 206 may be configured to generate the second deformed 3D human body model as the reconstructed 3D model of the first human subject 110 for the first pose based on the first plurality of pose parameters. Examples of implementations of the pose modeler 206 may be a specialized circuitry, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), or other control circuits.

The memory device 208 may comprise suitable logic, circuitry, and/or interfaces that may be configured to store a set of instructions executable by the modeling circuitry 202. The memory device 208 may be configured to store operating systems and associated applications. In accordance with an embodiment, the memory device 208 may be further configured to store the captured plurality of depth values of the first human subject 110 and the captured plurality of images of the first human subject 110 from the single viewpoint. The memory device 208 may be configured to store the reference 3D human body model and structural information of the skeleton comprising the plurality of joints of the human body. The stored reference 3D human body model may comprise the mean body shape and the set of body shape variations that represent deviations from the mean body shape of the human body. The memory device 208 may be further configured to store the generated reconstructed 3D model of the first human subject 110. Examples of implementation of the memory device 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 210 may comprise suitable logic, circuitry, and/or interfaces that may be configured to receive an input from the first human subject 110 and provide an output to the first human subject 110 based on received input from the first human subject 110. For example, the I/O device 210 may be utilized to initialize the operation to reconstruct 3D model human body model based on a request from the first human subject 110. The I/O device 210 may comprise various input and output devices, which may be configured to communicate with the modeling circuitry 202. Examples of the I/O device 210 may include, but are not limited to, a touch screen, a keyboard, a mouse, a joystick, a microphone, a display screen (for example, the display screen 210A), and a speaker.

The display screen 210A may comprise suitable logic, circuitry, and/or interfaces that may be configured to render the application interface 214 at the display screen 210A, for display of the reconstructed 3D model of the first human subject 110. In accordance with an embodiment, the display screen 210A may be configured to receive input from the first human subject 110. In such a scenario, the display screen 210A may be a touch screen, which may enable the first human subject 110 to provide input. The touch screen may be at least one of a resistive touch screen, a capacitive touch screen, or a thermal touch screen. In accordance with an embodiment, the display screen 210A may receive the input through a virtual keypad, a stylus, a gesture-based input, or a touch-based input. The display screen 210A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 210A may refer to a display screen of a smart-glass device, a see-through display, a projection-based display, an electro-chromic display, or a transparent display. In accordance with an embodiment, the display screen 210A may be an external display screen that may be connected to the VR-based apparatus 102.

The network interface 212 may comprise suitable logic, circuitry, and/or interfaces that may be configured to facilitate communication between the VR-based apparatus 102, the server 104, and the sensing device 106, via the communication network 108. The network interface 212 may be implemented by use of various known technologies to support wired or wireless communication of the VR-based apparatus 102 with the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 214 may correspond to a user interface (UI) rendered on a display screen, such as the display screen 210A, or a display device 216. The application interface 214 may display the reconstructed 3D model of the first human subject 110. The reconstructed 3D model of the first human subject 110 may be viewed from a plurality of view-points, by use of the application interface 214. An example of the application interface 214 may include, but is not limited to, a graphical user interface (GUI). The display device 216 may be an external display device. In some embodiments, instead of an integrated display screen 210A, the reconstructed 3D model of the first human subject 110 may be rendered on the display device 216. Examples of the display device 216 may be similar to that of the display screen 210A, The functions or operations executed by the VR-based apparatus 102, as described in FIG. 1, may be performed by the modeling circuitry 202, the shape modeler 204 and the pose modeler 206. The operations executed by the modeling circuitry 202, the shape modeler 204 and the pose modeler 206 are further described, for example, in the FIGS. 3A and 3B, 4A and 4B.

Figure 3A:
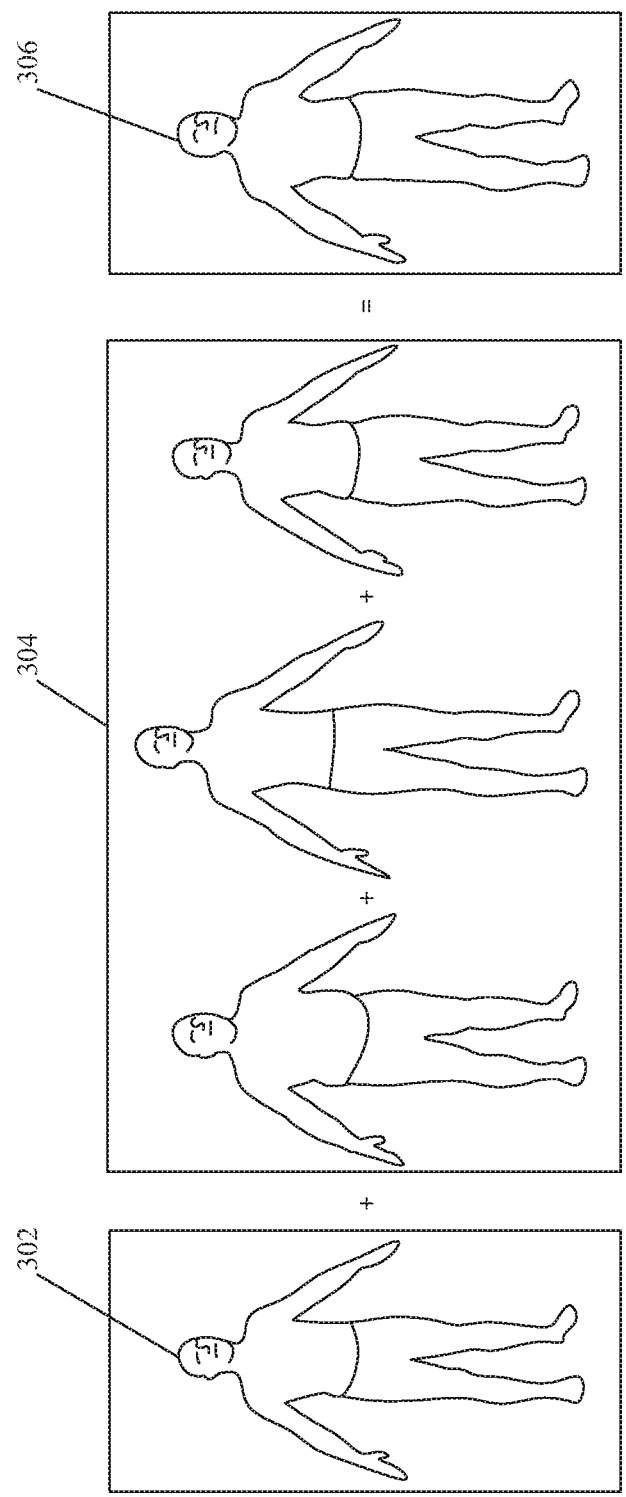
FIGS. 3A and 3B, collectively, illustrate exemplary operations for reconstructing three-dimensional (3D) human body model using depth data from single viewpoint, in accordance with an embodiment of the disclosure.
Figure 3B:
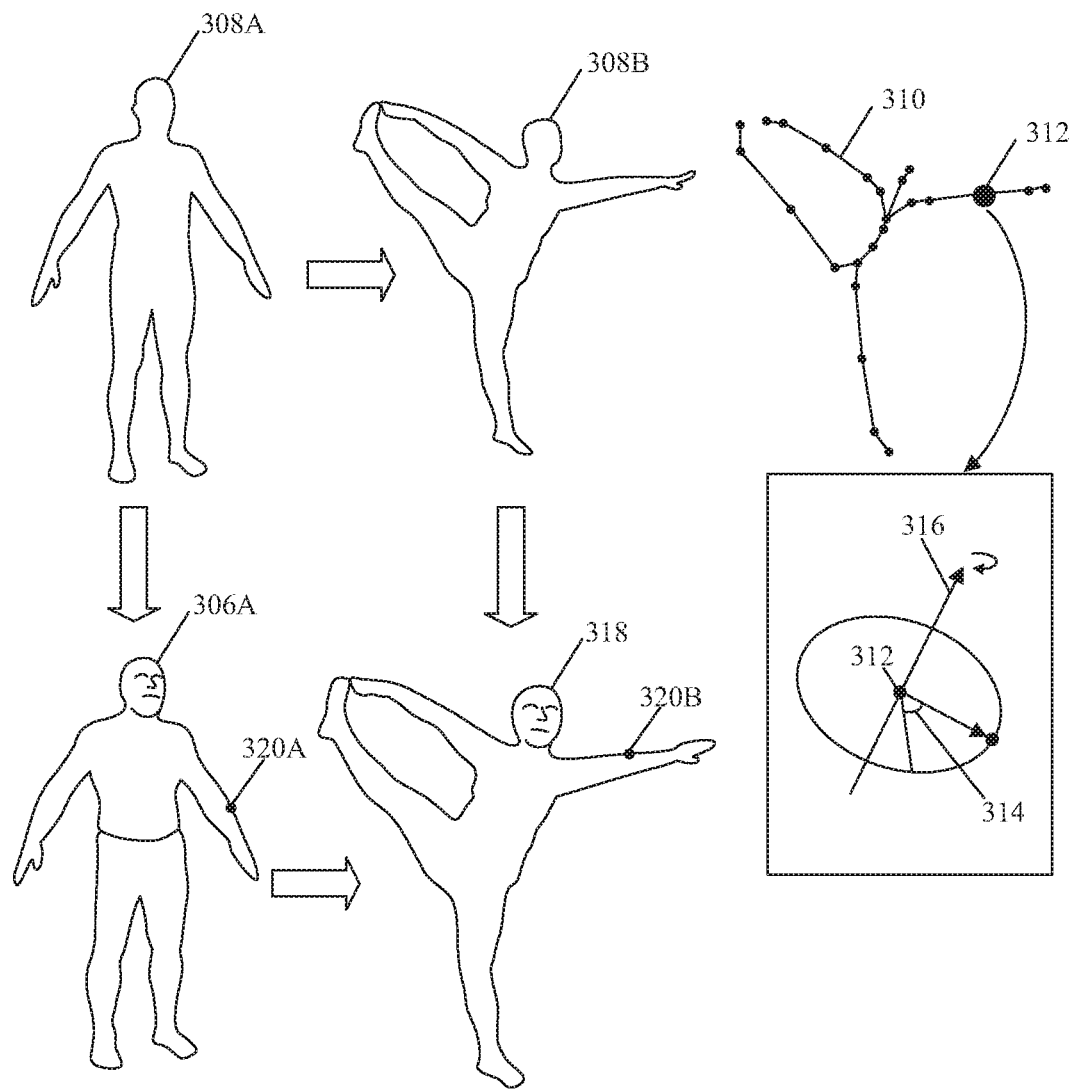

FIGS. 3A and 3B, collectively, illustrate exemplary operations for reconstructing 3D human body model using depth data from single viewpoint, in accordance with an embodiment of the disclosure. FIGS. 3A and 3B are explained in conjunction with elements from FIGS. 1 and 2.

FIG. 3A illustrates generation of the first deformed 3D human body model based on the plurality of shape parameters, in accordance with an embodiment of the disclosure. With reference to FIG. 3A, there is shown a mean body shape 302, a set of body shape variations 304, and an output shape, such as a first shape 306 of the first human subject 110. In accordance with an embodiment, the shape modeler 204 may be configured to determine the first shape 306 of the first human subject 110 based on the captured plurality of depth values of the first human subject 110 from the single viewpoint. The set of body shape variations 304 may comprise a plurality of human body models in different shapes, such as a shape "$S_1$", a shape "$S_2$", and the like. The set of body shape variations 304 may represent deviations from the mean body shape 302 of the reference 3D human body model. The shape modeler 204 may be configured to represent the first shape 306 as a linear combination of the set of body shape variations 304. The first shape 306 may be represented as the linear combination of the set of body shape variations 304, for example, by equation (1) as given below:

$$M + \theta_1^S S_1 + \theta_2^S S_2 + \ldots + \theta_k^S S_k = M(\theta^S) \qquad (1)$$

where, M represents the mean body shape 302;

"$S_1$" represents a first body shape variation of the set of body shape variations 304;

"$\theta_1^S$" represents a linear coefficient of the first body shape variation "$S_1$";

"$S_2$" represents a second body shape variation of the set of body shape variations 304;

"$\theta_2^S$" resents a linear coefficient of the second body shape variation "$S_2$";

"$S_k$" represents the plurality of set of body shape variations;

"k" represents a number of body shape variations in the set of body shape variations 304; and "$M(\theta^S)$" represents the first shape 306 of the first human subject 110.

In accordance with an embodiment, the shape modeler 204 may be configured to determine a plurality of shape parameters for the deformation of the mean body shape 302 of the reference 3D human body model to the determined first shape 306. The linear coefficients of each body shape variation, such as the first body shape variation and the second body shape variation, for representing the first shape 306 of the first human subject 110 may be the plurality of shape parameters. For example, the linear coefficients, which may be represented as "$\{\theta_i^S\}_{i=1}^k$", for each body shape variation, such as the first body shape variation "$S_1$" and the second body shape variation "$S_2$" may be the plurality of shape parameters for the deformation of the mean body shape 302 of the reference 3D human body model to the determined first shape 306.

In accordance with an embodiment, the disclosed VR-based apparatus 102 may utilize a different plurality of shape parameters for a male human subject and different plurality of shape parameters for a female human subject. For example, 10 shape parameters for the male human subject and 10 shape parameters for the female human subject for the deformation of the reference 3D human body model.

FIG. 3B illustrates operations for generation of reconstructed 3D model of the first human subject 110 by deformation of the first deformed 3D human body model, in accordance with an embodiment of the disclosure. With reference to FIG. 3B, there is shown the first human subject 110 in a neutral pose 308A and a first pose 308B, a first deformed 3D human body model 306A, a skeleton structure 310 corresponding to the first pose 308B. With reference to FIG. 3B, there is further shown a joint 312, a rotation angle 314 of the joint 312, an axis of rotation 316 of the joint 312, a second deformed 3D human body model 318, a first vertex 320A (also represented as "$t_i$") and a second vertex 320B (also represented as "$t_i'$").

In accordance with an embodiment, the shape modeler 204 may be configured to generate the first deformed 3D human body model 306A based on deformation of the mean body shape 302 of the reference 3D human body model to the determined first shape 306 of the first human subject 110. The first deformed 3D human body model 306A may be generated further based on the determined plurality of shape parameters. The first deformed 3D human body model 306A may resemble the first shape 306 of the first human subject 110. The generated first deformed 3D human body model 306A may correspond to the neutral pose 308A of the first human subject 110.

In accordance with an embodiment, the first pose 308B of the first human subject 110 may be represented by the skeleton structure 310 from the stored structural information of the skeleton (e.g., a rig) of the human body. Each joint, such as the joint 312, of the plurality of joints of the skeleton structure 310 for the first pose 308B of the first human subject 110 may be associated with a rigid rotation based on a rotation angle, such as the rotation angle 314, and an axis of rotation, such as the axis of rotation 316 of the joint 312 of the plurality of joints. A bone length of a plurality of bones of a skeleton may be different for different human subjects and may be different from the stored structural information of the skeleton of the human body. In a case when the bone length of the first human subject 110 may be different from the bone length of the stored structural information of the skeleton of the human body, the pose modeler 206 may be configured to utilize a global scale parameter to determine a relative bone length for the skeleton structure 310 corresponding to the first pose 308B of the first human subject 110. The pose modeler 206 may be further configured to compute a plurality of rigid transformation matrices for each joint, such as the joint 312, of the plurality of joints of the skeleton structure 310. The plurality of rigid transformation matrices for each joint of the plurality of joints may be computed based on a rotation angle with respect to an axis of rotation of a joint of the plurality of joints and a location of the joint of the plurality of joints. The plurality of rigid transformation matrices may be a plurality of transformation matrices that may be utilized for rigid transformation of the first deformed 3D human body model 306A based on the pose of the first human subject 110. The plurality of rigid transformation matrices may be utilized, such that, a shape and size of the first deformed 3D human body model 306A may remain unchanged, based on the pose of the first human subject 110. For example, a rigid transformation matrix for the joint 312 of the plurality of joints may be computed based on the rotation angle 314 with respect to the axis of rotation 316 of the joint 312 and the location of the joint 312. The plurality of rigid transformation matrices for each joint of the plurality of joints may be computed, for example, by equation (2) as given below:

$$G(\theta_j^p, j) = \begin{pmatrix} \left[e^{\theta_j^p \bar{\omega}_j}\right]_{3\times 3} & 1_{j\, 3\times 1} \\ 0_{1\times 3} & 1 \end{pmatrix} \quad (2)$$

where "$G(\theta_j^p, j)$" represents the rigid transformation matrix of a joint "j" for a pose "p";

"$\theta_j^p$" represents the rotation angle of the joint "j";

"$\bar{\omega}_j$" represents the axis of rotation of the joint "j"; and

"$1_j$" represents the location of the joint "j".

In accordance with an embodiment, the pose modeler 206 may be configured to determine a first plurality of pose parameters for the first pose 308B of the first human subject 110 based on the computed plurality of rigid transformation matrices. The determination of the first plurality of pose parameters may be further based on the rotation angle, such as the rotation angle 314, of the joint, such as the joint 312, of the plurality of joints. A 3D model may be a 3D computer graphics model that represent a physical body using a collection of points in a 3D space which are connected by geometric entities, such as polygons. A 3D model may comprise a plurality of vertices, such that a vertex of the 3D model may be a point where one or more polygons of the 3D model may intersect with each other. In accordance with an embodiment, the pose modeler 206 may be configured to determine a first plurality of blend weights for a plurality of vertices of the first deformed 3D human body model 306A. Each blend weight of the first plurality of blend weights may indicate an extent of deformation that is to be exerted on each vertex of the plurality of vertices of the first deformed 3D human body model 306A to represent the first pose 308B of the first human subject 110. Alternatively stated, a blend weight, such as a blend weight "$w_{j,i}$", of the first plurality of blend weights for the first vertex 320A (also represented as "$t_i$") of the first deformed 3D human body model 306A, may indicate an amount of deformation that may be required to be applied on the first vertex 320A ("$t_i$") as a result of one or more joints of the plurality of joints for representation of the first pose 308B of the first human subject 110. The number of joints that affect the deformation of the vertex, such as the first vertex 320A ("$t_i$"), of the plurality of vertices of the first deformed 3D human body model 306A may be one or more than one, based on the pose of the first human subject 110. The pose modeler 206 may be further configured to control the deformation of the plurality of vertices of the first deformed 3D human body model 306A based on the determined first plurality of blend weights, such as the blend weight "$w_{j,i}$", for the plurality of vertices, such as the first vertex 320A ("$t_i$"), for the first pose 308B of the first human subject 110.

In accordance with an embodiment, the pose modeler 206 may be configured to deform the plurality of vertices of the first deformed 3D human body model 306A to generate the second deformed 3D human body model 318 for the first pose 308B of the first human subject 110. The pose modeler 206 may be configured to deform the vertex, such as the first vertex 320A ("$t_i$"), of the first deformed 3D human body model 306A to a deformed vertex, such as the second vertex 320B (also represented as "$t_i'$"), of the second deformed 3D human body model 318. The deformation of the plurality of vertices of the first deformed 3D human body model 306A may be based on a linear combination of the plurality of rigid transformation matrices of the plurality of joints and the determined first plurality of blend weights for the plurality of vertices for the first pose 308B of the first human subject 110. The first vertex 320A ("$t_i$") may be deformed to generate the deformed second vertex 320B ("$t_i'$"), for example, by equation (3) as given below:

$$t_i' = \Sigma_{j=1}^m w_{j,i} G(\theta_j^p, J) t_i \quad (3)$$

where "$w_{j,i}$" represents the blend weight for the vertex "$t_i$" corresponding to joint "j"; and $G(\theta_j^p, J)$ represents the rigid transformation matrix;

In accordance with an embodiment, the pose modeler 206 may be configured to generate the second deformed 3D human body model 318 by deformation of the plurality of vertices of the first deformed 3D human body model 306A, such as the first vertex 320A ("$t_i$"). The second deformed 3D human body model 318 may comprise a plurality of deformed vertices, such as the second vertex 320B ("$t_i'$"), that may represent the first pose 308B of the first human subject 110. The modeling circuitry 202 may be configured to optimize the plurality of shape parameters and the first plurality of pose parameters, such that the deviation between the second deformed 3D human body model 318 and the determined first shape 306 and the first pose 308B of the first human subject 110 may be minimum. The modeling circuitry 202 may be configured to generate the reconstructed 3D model of the first human subject 110 from the second deformed 3D human body model 318 based on the optimal plurality of shape parameters and the optimal first plurality of pose parameters for the first pose 308B of the first human subject 110. The reconstructed 3D model of the first human subject 110 for the first pose 308B may be generated, for example, by equation (4) as given below:

$$\min_{\theta^S, \theta^P} \left\| \sum_{j=1}^{m} W_j G_j(\theta^P)(M + \theta^S \cdot S) - V \right\| \quad (4)$$

where "$\theta^P$" represents the optimal first plurality of pose parameters for the first pose 308B of the first human subject 110;
"$\theta^S$" represents the optimal plurality of shape parameters for the first shape 308 of the first human subject 110;
"M" represents the mean body shape of the stored reference 3D human body model;
"V" represents the plurality of depth values;

In accordance with an embodiment, the modelling circuitry 202 may be configured to control the display of the reconstructed 3D model of the first human subject 110 on a display screen, such as the display screen 210A or the display device 216. The modeling circuitry 202 may control the display of the reconstructed 3D model of the first human subject 110 on the display screen 210A, such that a shape and pose of the reconstructed 3D model exhibits a minimum deviation from the first shape 306 and first pose 308B of the first human subject 110. In some embodiments, the modeling circuitry 202 may be configured to control display of the refined 3D model of the first human subject 110 on a remote display device (not shown). Since, the reconstructed 3D model of the first human subject 110 exhibits minimum deviation from the first shape 306 and the first pose 308B of the first human subject 110, the display of the reconstructed 3D model is realistic in nature. Although, the plurality of depth values of the first human subject 110 are captured from single viewpoint, the displayed reconstructed 3D model of the first human subject 110 may display a full body 3D model of the first human subject 110. A plurality of appearance attributes of the body of the first human subject 110 are visible clearly on a display screen, such as the display screen 210A, of the VR-based apparatus 102.

In accordance with an embodiment, the modeling circuitry 202 may be configured to estimate a change in configuration of each joint with respect to other joints of the plurality of joints in response to a change in pose of the first human subject 110. A pose of the first human subject 110 may change from the first pose 308B to a second pose. The modeling circuitry 202 may be configured to update the second deformed 3D human body model 318 to a third deformed 3D human body model, based on deformation of the plurality of vertices of the second deformed 3D human body model 318 for the second pose of the first human subject 110. The plurality of vertices of the second deformed 3D human body model 318 may be deformed based on the determined second plurality of blend weights and a second plurality of pose parameters for the second pose of the first human subject 110. The pose modeler 206 may determine the second plurality of blend weights and the second plurality of pose parameters for the second pose of the first human subject 110. Furthermore, the modeling circuitry 202 may be configured to update the second deformed 3D human body model 318 to the third deformed 3D human body model as the updated reconstructed 3D model of the first human subject 110 for the second pose. The modeling circuitry 202 may be configured to update the display of the updated reconstructed 3D model for the second pose of the first human subject 110 on a display screen, such as the display screen 210A or the display device 216. The modeling circuitry 202 may be configured to display the updated reconstructed 3D model for the second pose of the first human subject 110, such that the display of the updated reconstructed 3D model for the second pose of the first human subject 110 is realistic. The updated reconstructed 3D model for the second pose of the first human subject 110 exhibits minimum deviation from the first shape 306 and the second pose of the first human subject 110.

Figure 4A:
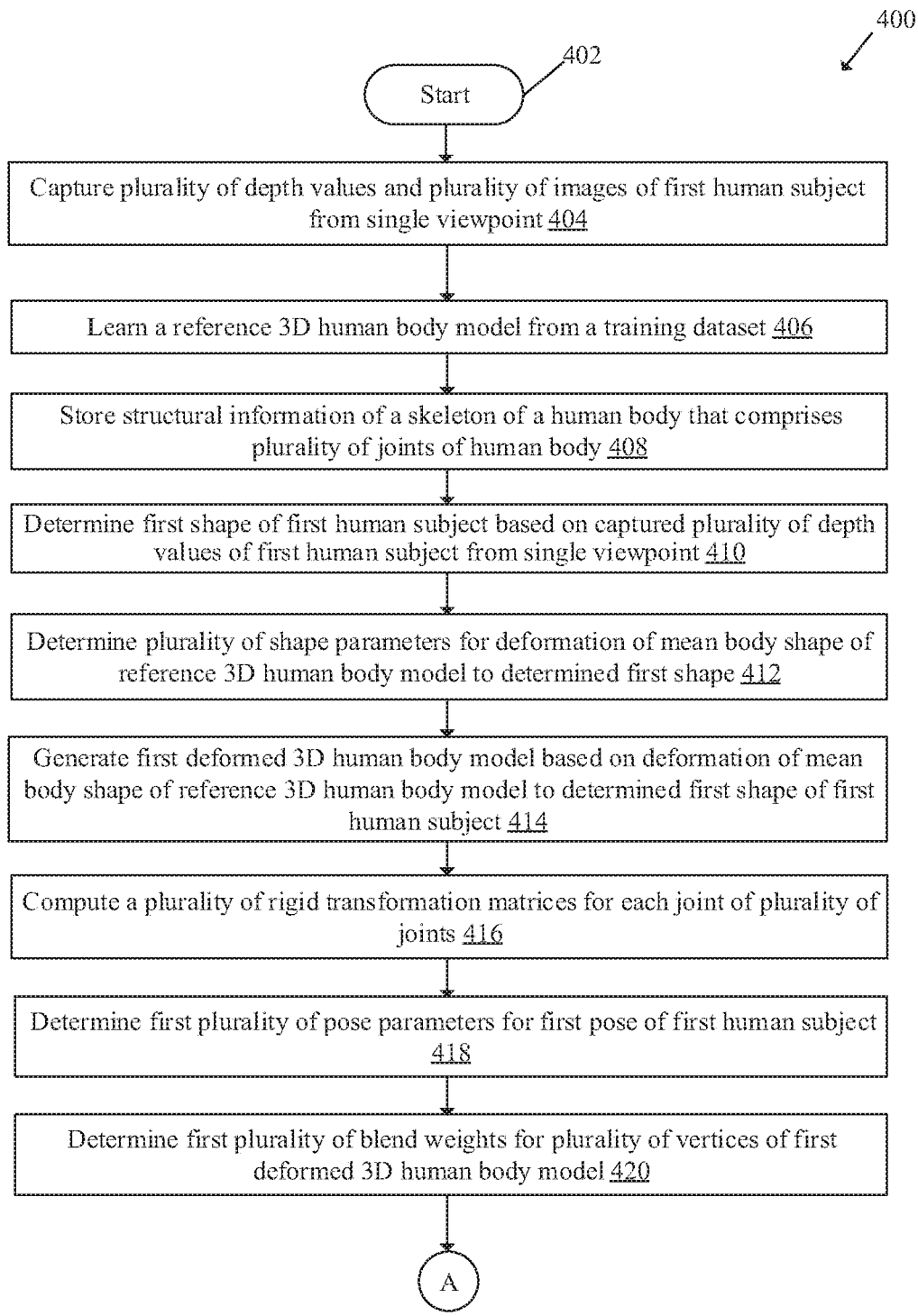
FIGS. 4A and 4B, collectively, depict a flowchart that illustrates exemplary operations for reconstructing three-dimensional (3D) human body model using depth data from single viewpoint, in accordance with an embodiment of the disclosure.
Figure 4B:
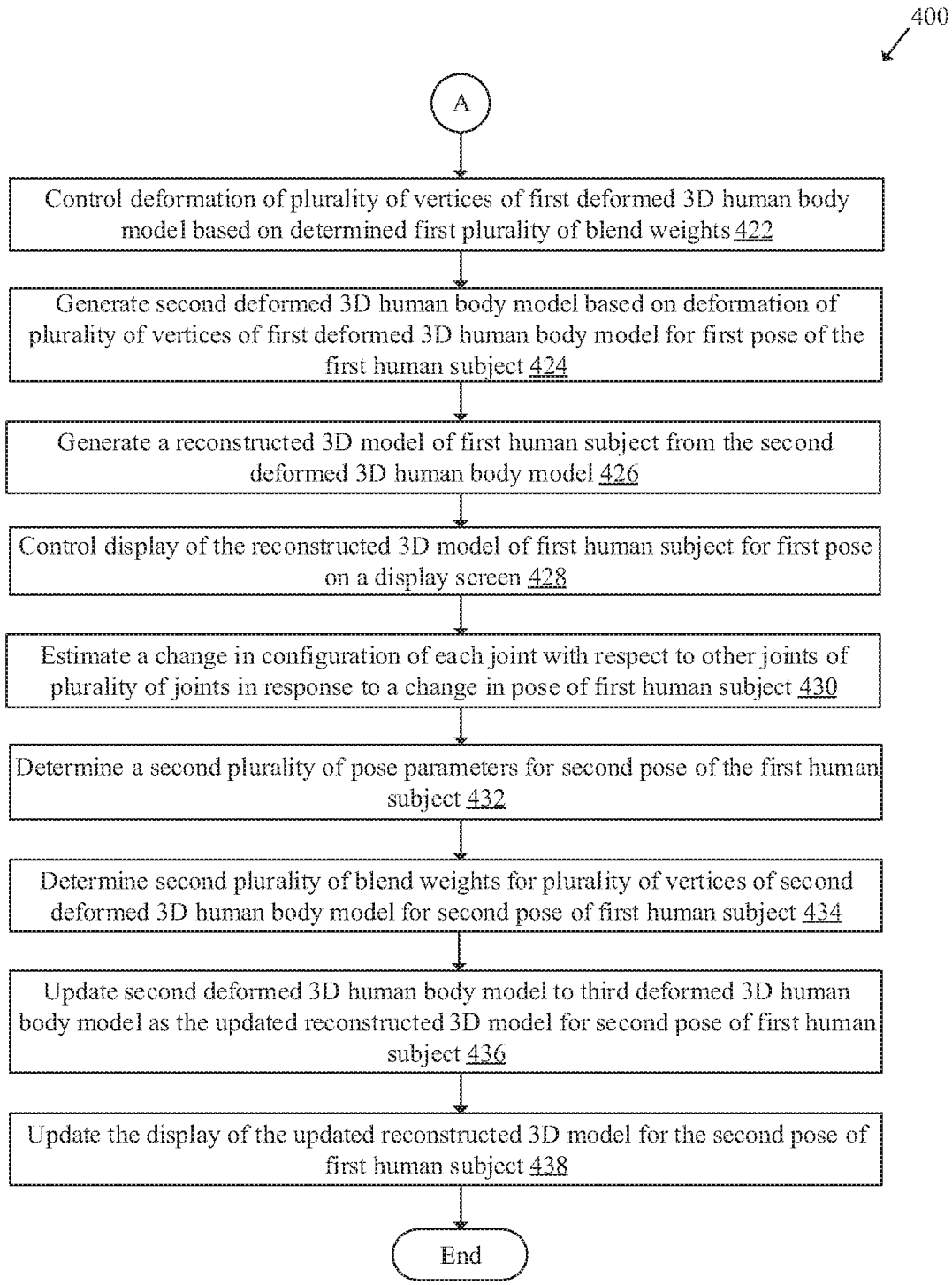

FIGS. 4A and 4B are flowcharts that collectively illustrate exemplary operations of, reconstructing 3D human body model using depth data from single viewpoint, in accordance with an embodiment of the disclosure. With reference to FIGS. 4A and 4B, there is shown a flowchart 400. The flowchart 400 is described in conjunction with FIGS. 1, 2, 3A and 3B. The operations from 404 to 438 may be implemented in the VR-based apparatus 102. The operations of the flowchart 400 may start at 402 and proceed to 404.

At 404, a plurality of depth values and a plurality of images of the first human subject 110 may be captured from a single viewpoint. The sensing device 106 may comprise the depth sensor 106B configured to capture the plurality of depth values of the first human subject 110 from the single viewpoint. The sensing device 106 may further comprise the image sensor 106A configured to capture the plurality of images of the first human subject 110 from the single viewpoint. The captured plurality of depth values may include values of "Z" coordinates of the first human subject 110 in a 3D coordinate system from the single viewpoint.

At 406, a reference 3D human body model may be learned from a training dataset. The VR-based apparatus 102 may be configured to learn the reference 3D human body model from the training dataset, for example the Caesar dataset, that comprises a plurality of representative human body models of different shapes, for example, about 4000 representative human body models of different shapes in a neutral pose. The reference 3D human body model may include a mean body shape, such as the mean body shape 302 and a set of body shape variations, such as the set of body shape variations 304. The set of body shape variations 304 may comprise a plurality of human body models in different shapes, for example, a tall human body model, a short human body model, a thin human body model, a fat human body model and the like. The set of body shape variations 304 may represent deviations from the mean body shape 302 of the reference 3D human body model.

At 408, structural information of a skeleton (e.g. a rig) of a human body that comprises a plurality of joints of the human body may be stored. The memory device 208 may be configured to store the structural information of a skeleton of a human body. The structural information of the skeleton of the human body may comprise structural information of a plurality of joints of the human body.

At 410, a first shape of the first human subject 110 may be determined based on the captured plurality of depth values of the first human subject 110 from the single viewpoint. The shape modeler 204 may be configured to determine the first shape, such as the first shape 306 as shown in FIG. 3A, that may be represented as a linear combination of the set of body shape variations.

At 412, a plurality of shape parameters for the deformation of the mean body shape 302 of the reference 3D human body model to the determined first shape 306 may be determined. The linear coefficients of each body shape variation, such as the first body shape variation and the second body shape variation, for representing the first shape 306 of the first human subject 110 may be the plurality of shape parameters.

At 414, a first deformed 3D human body model 306A may be generated based on deformation of the mean body shape 302 of the reference 3D human body model to the determined first shape 306 of the first human subject 110. The shape modeler 204 may be configured to generate the first deformed 3D human body model 306A based on the determined plurality of shape parameters. The first deformed 3D human body model 306A may resemble the first shape 306 of the first human subject 110.

At 416, a plurality of rigid transformation matrices for each joint of the plurality of joints may be computed. The pose modeler 206 may be configured to compute a plurality of rigid transformation matrices for each joint of the plurality of joints from the stored structural information of the skeleton of the human body for a first pose, such as the first pose 308B, of the first human subject 110. The plurality of rigid transformation matrices for each joint of the plurality of joints may be computed based on a rotation angle with respect to an axis of rotation of a joint, such as the joint 312, of the plurality of joints and a location of the joint of the plurality of joints. The computation of the plurality of rigid transformation matrices is shown and described, for example, in FIG. 3B.

At 418, a first plurality of pose parameters for the first pose 308B of the first human subject 110 may be determined. The pose modeler 206 may be configured to determine the first plurality of pose parameters for the first pose 308B based on the computed plurality of rigid transformation matrices. The determination of the first plurality of pose parameters may be further based on the rotation angle, such as the rotation angle 314, of the joint, such as the joint 312, of the plurality of joints.

At 420, a first plurality of blend weights for a plurality of vertices of the first deformed 3D human body model 306A may be determined. The pose modeler 206 may be configured to determine the first plurality of blend weights for the plurality of vertices of the first deformed 3D human body model 306A. Each blend weight of the first plurality of blend weights may indicate an extent of deformation that is to be exerted on each vertex of the plurality of vertices of the first deformed 3D human body model 306A to represent the first pose 308B of the first human subject 110. The determination of the first plurality of blend weights for the plurality of vertices of the first deformed 3D human body model 306A is shown and described, for example, in FIG. 3B.

At 422, deformation of the plurality of vertices of the first deformed 3D human body model 306A may be controlled, based on the determined first plurality of blend weights. The pose modeler 206 may be configured to control the deformation of the plurality of vertices of the first deformed 3D human body model 306A, based on the first plurality of blend weights for the first pose 308B of the first human subject 110.

At 424, a second deformed 3D human body model 318 may be generated based on the deformation of the plurality of vertices of the first deformed 3D human body model 306A for the first pose 308B of the first human subject 110. The pose modeler 206 may be configured to deform the plurality of vertices of the first deformed 3D human body model 306A, based on a linear combination of the plurality of rigid transformation matrices of the plurality of joints and the determined first plurality of blend weights for the plurality of vertices for the first pose 308B of the first human subject 110. The generation of the second deformed 3D human body model 318 is shown and described, for example, in FIG. 3B.

At 426, reconstructed 3D model of the first human subject 110 from the second deformed 3D human body model 318 may be generated. The modeling circuitry 202 may be configured to generate the reconstructed 3D model of the first human subject 110 from the second deformed 3D human body model 318 based on the optimal plurality of shape parameters and the optimal first plurality of pose parameters for the first pose 308B of the first human subject 110. The generation of the reconstructed 3D model of the first human subject 110 for the first pose 308B is shown and described, for example, in FIG. 3B.

At 428, display of the reconstructed 3D model of the first human subject 110 for the first pose 308B may be controlled on a display screen, such as the display screen 210A. The modeling circuitry 202 may control the display of the reconstructed 3D model of the first human subject 110 on the display screen 210A, such that a shape and pose of the reconstructed 3D model exhibits a minimum deviation from the first shape 306 and first pose 308B of the first human subject 110. The display of the reconstructed 3D model on the display screen 210A may be realistic in nature.

At 430, a change in configuration of each joint with respect to other joints of the plurality of joints in response to a change in pose of the first human subject 110 may be estimated. The pose modeler 206 may be configured to estimate the change in configuration of each joint with respect to other joints of the plurality of joints in response to a change in pose of the first human subject 110 from the first pose 308B to a second pose.

At 432, a second plurality of pose parameters for the second pose of the first human subject 110 may be determined. The pose modeler 206 may be configured to determine the second plurality of pose parameters for the second pose of the first human subject 110. The second plurality of pose parameters may be determined, based on the plurality of rigid transformation matrices and the plurality of depth values captured from the single viewpoint for the second pose of the first human subject 110.

At 434, a second plurality of blend weights for a plurality of vertices of the second deformed 3D human body model 318 may be determined for the second pose of the first human subject 110. The pose modeler 206 may be configured to determine the second plurality of blend weights for a plurality of vertices of the second deformed 3D human body model 318 for the second pose of the first human subject 110. Each blend weight of the second plurality of blend weights may indicate an extent of deformation that is to be exerted on each vertex of the plurality of vertices of the second deformed 3D human body model 318 for the second pose of the first human subject 110.

At 436, the second deformed 3D human body model 318 may be updated to a third deformed 3D human body model as the updated reconstructed 3D model for the second pose of the first human subject 110. The pose modeler 206 may be configured to update the second deformed 3D human body model 318 to a third deformed 3D human body model as the updated reconstructed 3D model, based on deformation of the plurality of vertices of the second deformed 3D human body model 318. The plurality of vertices of the second deformed 3D human body model 318 may be deformed based on the determined second plurality of blend weights and a second plurality of pose parameters for the second pose of the first human subject 110.

At 438, the display of the updated reconstructed 3D model for the second pose of the first human subject 110 may be updated. The modeling circuitry 202 may be configured to update the display of the updated reconstructed 3D model for the second pose of the first human subject 110 on a display screen, such as the display screen 210A. The modeling circuitry 202 may be configured to display the updated reconstructed 3D model for the second pose of the first human subject 110. The updated reconstructed 3D model for the second pose of the first human subject 110 exhibits minimum deviation from the first shape 306 and the second pose of the first human subject 110.

Exemplary aspects of the disclosure may include a VR-based apparatus (such as the VR-based apparatus 102) that includes a memory device (such as the memory device 208) configured to store a reference 3D human body model and structural information of a skeleton comprising a plurality of joints of a human body. The stored reference 3D human body model may further comprise a mean body shape and a set of body shape variations that represent deviations from the mean body shape of the human body. The memory device may be further configured to structural information of a skeleton comprising a plurality of joints of a human body. The VR-based apparatus may be communicatively coupled to a sensing device (such as the sensing device 106) that may include a depth sensor (such as the depth sensor 106B) configured to capture a plurality of depth values of a first human subject that is to be modeled from a single viewpoint. The VR-based apparatus may further include a modeling circuitry (such as the modeling circuitry 202) configured to determine a first shape of the first human subject based on the captured plurality of depth values of the first human subject from the single viewpoint. The modeling circuitry may be further configured to generate a first deformed 3D human body model by deformation of the mean body shape of the reference 3D human body model to the determined first shape of the first human subject. The first deformed 3D human body model may be generated based on a linear combination of the set of body shape variations. The modeling circuitry may be configured to determine a first plurality of pose parameters for a first pose of the first human subject based on a plurality of rigid transformation matrices and the plurality of depth values captured from the single viewpoint for the first pose of the first human subject. Each rigid transformation matrix of the plurality of rigid transformation matrices may include a rotation angle with respect to an axis of rotation of a joint of the plurality of joints and a location of the joint of the plurality of joints. The modeling circuitry may be further configured to control display of the generated second deformed 3D human body model as a reconstructed 3D model of the first human subject on a display device (such as the display device 210A). The display of the reconstructed 3D model of the first human subject may be controlled such that the reconstructed 3D model exhibits minimum deviation from the determined first shape and the first pose of the first human subject.

In accordance with an embodiment, the modeling circuitry may be configured to learn the reference three dimensional (3D) human body model from a training dataset that comprises a plurality of representative human body models of different shapes. The modeling circuitry may be further configured to determine a plurality of shape parameters for the deformation of the mean body shape of the reference 3D human body model. The plurality of shape parameters may include one linear coefficient in each body shape variation of the set of body shape variations for the determined first shape of the first human subject.

In accordance with an embodiment, each joint of the plurality of joints in the structural information of the skeleton may be associated with a rigid rotation based on the rotation angle and the axis of rotation of each joint of the plurality of joints. The modeling circuitry may be configured to determine a first plurality of blend weights for the plurality of vertices of the first deformed 3D human body model. Each blend weight may indicate an extent of deformation that is to be exerted on each vertex of the plurality of vertices to represent the first pose of the first human subject. The modeling circuitry may be further configured to control a deformation of the plurality of vertices of the first deformed 3D human body model. The deformation of the plurality of vertices of the first deformed 3D human body model may be controlled, based on the determined first plurality of blend weights for the plurality of vertices for the first pose of the first human subject. The modeling circuitry may be further configured to deform the plurality of vertices based on a linear combination of the plurality of rigid transformation matrices of the plurality of joints and the determined first plurality of blend weights for the plurality of vertices for the first pose of the first human subject.

In accordance with an embodiment, the modeling circuitry may be configured to estimate a change in configuration of each joint with respect to other joints of the plurality of joints in response to a change in pose of the first human subject from the first pose to a second pose. The modeling circuitry may be further configured to determine a second plurality of pose parameters for the second pose of the first human subject. The second plurality of pose parameters may be determined based on the plurality of rigid transformation matrices and the plurality of depth values captured from the single viewpoint for the second pose of the first human subject. The modeling circuitry may be configured to determine a second plurality of blend weights for a plurality of vertices of the second deformed 3D human body model. Each blend weight may indicate an extent of deformation that is to be exerted on each vertex of the plurality of vertices for the second pose of the first human subject.

In accordance with an embodiment, the modeling circuitry may be configured to update the second deformed 3D human body model to a third deformed 3D human body model. The second deformed 3D human body model may be updated to a third deformed 3D human body model, based on deformation of the plurality of vertices of the second deformed 3D human body model. The deformation of the plurality of vertices of the second deformed 3D human body model may be executed based on the determined second plurality of blend weights for the plurality of vertices of the second deformed 3D human body model. The deformation of the plurality of vertices of the second deformed 3D human body model may be executed further based on a second plurality of pose parameters for the second pose of the first human subject. The modeling circuitry may be further configured to update the display of the generated second deformed 3D human body model to the third deformed 3D human body model for the second pose on the display device. The display of the generated second deformed 3D human body model may be updated to the third deformed 3D human body model for the second pose such that the reconstructed 3D model exhibits minimum deviation from the determined first shape and the second pose of the first human subject.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits communicatively coupled to a sensing device. The set of instructions may be executable by the machine and/or the computer to perform the steps that comprise the storage of a reference three dimensional (3D) human body model and structural information of a skeleton comprising a plurality of joints of a human body. The reference 3D human body model comprises a mean body shape and a set of body shape variations that represent deviations from the mean body shape. A plurality of depth values of a first human subject that is to be modeled may be captured from a single viewpoint. A first shape of the first human subject may be determined based on the captured plurality of depth values of the first human subject from the single viewpoint. A first deformed 3D human body model may be generated by deformation of the mean body shape of the reference 3D human body model to the determined first shape of the first human subject using a linear combination of the set of body shape variations. A first plurality of pose parameters for a first pose of the first human subject may be determined based on a plurality of rigid transformation matrices and the plurality of depth values captured from the single viewpoint for the first pose of the first human subject. Each rigid transformation matrix of the plurality of rigid transformation matrices may include a rotation angle with respect to an axis of rotation of a joint of the plurality of joints and a location of the joint of the plurality of joints. A second deformed 3D human body model may be generated by deformation of a plurality of vertices of the first deformed 3D human body model using the computed first plurality of pose parameters. Display of the generated second deformed 3D human body model may be controlled as a reconstructed 3D model of the first human subject on a display device. The display may be controlled such that the reconstructed 3D model exhibits minimum deviation from the determined first shape and the first pose of the first human subject.

In accordance with an exemplary aspect of the disclosure, the VR-based apparatus 102 may be a virtual-reality or augmented-reality based device. Thus, the operations executed by the VR-based apparatus 102 as described in the present disclosure, may also be executed by the virtual-reality or augmented-reality based device. For example, the virtual-reality based device may present a human body model, such as the reconstructed 3D model, of a first human, such as the first human subject 110 to a second human. The reconstructed 3D model of the first human subject 110 may mimic the body of the first human subject in a plurality of poses in real time or near-real time. The reconstructed 3D model of the first human subject 110 may also be textured with image data to resemble the first human subject 110. Thus, the display of the reconstructed 3D model by the virtual reality based device creates a virtual presence of the first human, such as the first human subject, in a remote location, for the second human.

In accordance with another exemplary aspect of the disclosure, the VR-based apparatus 102 may be a gaming device. Thus, the operations executed by the VR-based apparatus 102 as described in the present disclosure, may also be executed by the gaming device. For example, the gaming device may present a gaming character, such as the reconstructed 3D model of the first human subject 110, in a gaming environment to a player. The gaming device may further cause the gaming character to imitate one or more poses of the of the player. This may enable the player to control movement of the gaming character in the gaming environment. For example, in the event the player starts to move his head, the gaming character may imitate the moving head of the player. The gaming environment may also be a multiplayer game. In such a case, the gaming device may present a plurality of gaming characters, each imitating one of the multiple players in the multiplayer game.

In accordance with yet another exemplary aspect of the disclosure, the VR-based apparatus 102 may be a 3D model-based conferencing system. Thus, the operations executed by the VR-based apparatus 102 as described in the present disclosure, may also be executed by the 3D model-based conferencing system. Usually, the conventional video conferencing systems require a high network bandwidth for a seamless transmission of video. In an event that the requirement of network bandwidth is not fulfilled, video conferencing is hindered. The 3D model based conferencing device, such as the VR-based apparatus 102, enables video less conferencing that may not require a high network bandwidth for video transmission. For example, the 3D model based conferencing device may track one or more poses of a first person involved in conferencing. The 3D model based conferencing device may then animate a human 3D face model, such as the reconstructed model of the first human subject 110, based on the tracked one or more poses and shape of the first person, such as the first human subject 110. The animated 3D model may be presented along with recorded audio of the first person to a second person involved in the conferencing. The 3D model based conferencing device may further present another animated 3D model to the first person that imitates one or more poses and shape of the second person. Thus, the 3D model based conferencing device enables the first person and the second person to participate in conferencing.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A virtual reality (VR)-based apparatus, comprising:
a memory device configured to store a reference three dimensional (3D) human body model and structural information of a skeleton comprising a plurality of joints of a human body, wherein the reference 3D human body model comprises a mean body shape and a set of body shape variations that represent deviations from the mean body shape;
a depth sensor configured to capture a plurality of depth values of a first human subject that is to be modeled from a single viewpoint;
a modeling circuitry configured to:
determine a first shape of the first human subject based on the captured plurality of depth values of the first human subject from the single viewpoint;
generate a first deformed 3D human body model by deformation of the mean body shape of the reference 3D human body model to the determined first shape of the first human subject based on a linear combination of the set of body shape variations;
determine a first plurality of pose parameters for a first pose of the first human subject based on a plurality of rigid transformation matrices and the plurality of depth values captured from the single viewpoint for the first pose of the first human subject, wherein each rigid transformation matrix of the plurality of rigid transformation matrices includes a rotation angle with respect to an axis of rotation of a joint of the plurality of joints and a location of the joint of the plurality of joints;
generate a second deformed 3D human body model by deformation of a plurality of vertices of the first deformed 3D human body model based on the determined first plurality of pose parameters; and
control display of the generated second deformed 3D human body model as a reconstructed 3D model of the first human subject on a display device such that the reconstructed 3D model exhibits minimum deviation from the determined first shape and the first pose of the first human subject.

2. The VR-based apparatus according to claim 1, wherein the modeling circuitry is further configured to learn the reference three dimensional (3D) human body model from a training dataset that comprises a plurality of representative human body models of different shapes.

3. The VR-based apparatus according to claim 1, wherein the modeling circuitry is further configured to determine a plurality of shape parameters for the deformation of the mean body shape of the reference 3D human body model, and
the plurality of shape parameters includes one linear coefficient in each body shape variation of the set of body shape variations for the determined first shape of the first human subject.

4. The VR-based apparatus according to claim 1, wherein each joint of the plurality of joints in the structural information of the skeleton is associated with a rigid rotation based on the rotation angle and the axis of rotation of each joint of the plurality of joints.

5. The VR-based apparatus according to claim 1, wherein the modeling circuitry is further configured to determine a first plurality of blend weights for the plurality of vertices of the first deformed 3D human body model, and
each blend weight indicates an extent of deformation that is to be exerted on each vertex of the plurality of vertices to represent the first pose of the first human subject.

6. The VR-based apparatus according to claim 5, wherein the modeling circuitry is further configured to control the deformation of the plurality of vertices of the first deformed 3D human body model based on the determined first plurality of blend weights for the plurality of vertices for the first pose of the first human subject.

7. The VR-based apparatus according to claim 6, wherein the modeling circuitry is further configured to deform the plurality of vertices based on a linear combination of the plurality of rigid transformation matrices of the plurality of joints and the determined first plurality of blend weights for the plurality of vertices for the first pose of the first human subject.

8. The VR-based apparatus according to claim 1, wherein the modeling circuitry is further configured to estimate a change in configuration of each joint with respect to other joints of the plurality of joints in response to a change in pose of the first human subject from the first pose to a second pose.

9. The VR-based apparatus according to claim 8, wherein the modeling circuitry is further configured to determine a second plurality of pose parameters for the second pose of the first human subject, based on the plurality of rigid transformation matrices and the plurality of depth values captured from the single viewpoint for the second pose of the first human subject.

10. The VR-based apparatus according to claim 8, wherein
the modeling circuitry is further configured to determine a second plurality of blend weights for a plurality of vertices of the second deformed 3D human body model, and
each blend weight indicates an extent of deformation that is to be exerted on each vertex of the plurality of vertices for the second pose of the first human subject.

11. The VR-based apparatus according to claim 10, wherein
the modeling circuitry is further configured to update the second deformed 3D human body model to a third deformed 3D human body model, based on deformation of the plurality of vertices of the second deformed 3D human body model, and
the deformation of the plurality of vertices of the second deformed 3D human body model is executed based on the determined second plurality of blend weights for the plurality of vertices of the second deformed 3D human body model and a second plurality of pose parameters for the second pose of the first human subject.

12. The VR-based apparatus according to claim 11, wherein the modeling circuitry is further configured update the display of the generated second deformed 3D human body model to the third deformed 3D human body model for the second pose on the display device such that the reconstructed 3D model exhibits minimum deviation from the determined first shape and the second pose of the first human subject.

13. A method, comprising:
in a virtual reality (VR)-based apparatus comprising a memory device, a depth sensor and modeling circuitry:
storing, by the memory device, a reference three dimensional (3D) human body model and structural information of a skeleton comprising a plurality of joints of a human body, wherein the reference 3D human body model comprises a mean body shape and a set of body shape variations that represent deviations from the mean body shape;
capturing, by the depth sensor, a plurality of depth values of a first human subject that is to be modeled from a single viewpoint;
determining, by the modeling circuitry, a first shape of the first human subject based on the captured plurality of depth values of the first human subject from the single viewpoint;
generating, by the modeling circuitry, a first deformed 3D human body model by deformation of the mean body shape of the reference 3D human body model to the determined first shape of the first human subject based on a linear combination of the set of body shape variations;
determining, by the modeling circuitry, a first plurality of pose parameters for a first pose of the first human subject based on a plurality of rigid transformation matrices and the plurality of depth values captured from the single viewpoint for the first pose of the first human subject, wherein each rigid transformation matrix of the plurality of rigid transformation matrices includes a rotation angle with respect to an axis of rotation of a joint of the plurality of joints and a location of the joint of the plurality of joints;
generating, by the modeling circuitry, a second deformed 3D human body model by deformation of a plurality of vertices of the first deformed 3D human body model based on the determined first plurality of pose parameters; and
controlling, by the modeling circuitry, display of the generated second deformed 3D human body model as a reconstructed 3D model of the first human subject on a display device such that the reconstructed 3D model exhibits minimum deviation from the determined first shape and the first pose of the first human subject.

14. The method according to claim 13, further comprising learning, by the modeling circuitry, the reference three dimensional (3D) human body model from a training dataset that comprises a plurality of representative human body models of different shapes.

15. The method according to claim 13, further comprising determining, by the modeling circuitry, a plurality of shape parameters for the deformation of the mean body shape of the reference 3D human body model, wherein the plurality of shape parameters includes one linear coefficient in each body shape variation of the set of body shape variations for the determined first shape of the first human subject.

16. The method according to claim 13, wherein each joint of the plurality of joints in the structural information of the skeleton is associated with a rigid rotation, based on the rotation angle and the axis of rotation of each joint of the plurality of joints.

17. The method according to claim 13, further comprising determining, by the modeling circuitry, a first plurality of blend weights for the plurality of vertices of the first deformed 3D human body model, wherein each blend weight indicates an extent of deformation that is to be exerted on each vertex of the plurality of vertices to represent the first pose of the first human subject.

18. The method according to claim 17, further comprising controlling, by the modeling circuitry, the deformation of the plurality of vertices of the first deformed 3D human body model based on the determined first plurality of blend weights for the plurality of vertices for the first pose of the first human subject.

19. The method according to claim 18, further comprising deforming, by the modeling circuitry, the plurality of vertices based on a linear combination of the plurality of rigid transformation matrices of the plurality of joints and the determined first plurality of blend weights for the plurality of vertices for the first pose of the first human subject.

20. The method according to claim 13, further comprising estimating, by the modeling circuitry, a change in configuration of each joint with respect to other joints of the plurality of joints in response to a change in pose of the first human subject from the first pose to a second pose.

21. A virtual reality (VR)-based apparatus, comprising:
a memory device to store a reference three dimensional (3D) human body model and structural information of a skeleton comprising a plurality of joints of a human body, wherein the reference 3D human body model comprises a mean body shape and a set of body shape variations that represent deviations from the mean body shape;
a depth sensor configured to capture a plurality of depth values of a first human subject that is to be modeled from a single viewpoint;
a modeling circuitry configured to:
determine a first shape of the first human subject based on the captured plurality of depth values of the first human subject from the single viewpoint;
generate a first deformed 3D human body model by deformation of the mean body shape of the reference 3D human body model to the determined first shape of the first human subject based on a linear combination of the set of body shape variations;
determine a first plurality of pose parameters for a first pose of the first human subject based on a plurality of rigid transformation matrices and the captured plurality of depth values from the single viewpoint for the first pose of the first human subject, wherein each rigid transformation matrix of the plurality of rigid transformation matrices includes a rotation angle with respect to an axis of rotation of a joint of the plurality of joints and a location of the joint of the plurality of joints;
generate a second deformed 3D human body model by deformation of a plurality of vertices of the first deformed 3D human body model based on the determined first plurality of pose parameters;
control display of the generated second deformed 3D human body model as a reconstructed 3D model of the first human subject on a display device such that the reconstructed 3D model exhibits minimum deviation from the determined first shape and the first pose of the first human subject;
estimate a change in configuration of each joint with respect to other joints of the plurality of joints in response to a change in pose of the first human subject from the first pose to a second pose;
determine a plurality of blend weights for a plurality of vertices of the second deformed 3D human body model, wherein each blend weight indicates an extent of deformation that is to be exerted on each vertex of the plurality of vertices for the second pose of the first human subject; and update the second deformed 3D human body model to a third deformed 3D human body model, based on deformation of the plurality of vertices of the second deformed 3D human body model, wherein the deformation of the plurality of vertices of the second deformed 3D human body model is executed based on the determined plurality of blend weights for the plurality of vertices of the second deformed 3D human body model and a second plurality of pose parameters for the second pose of the first human subject.

* * * * *